United States Patent Office 3,157,030
Patented Nov. 17, 1964

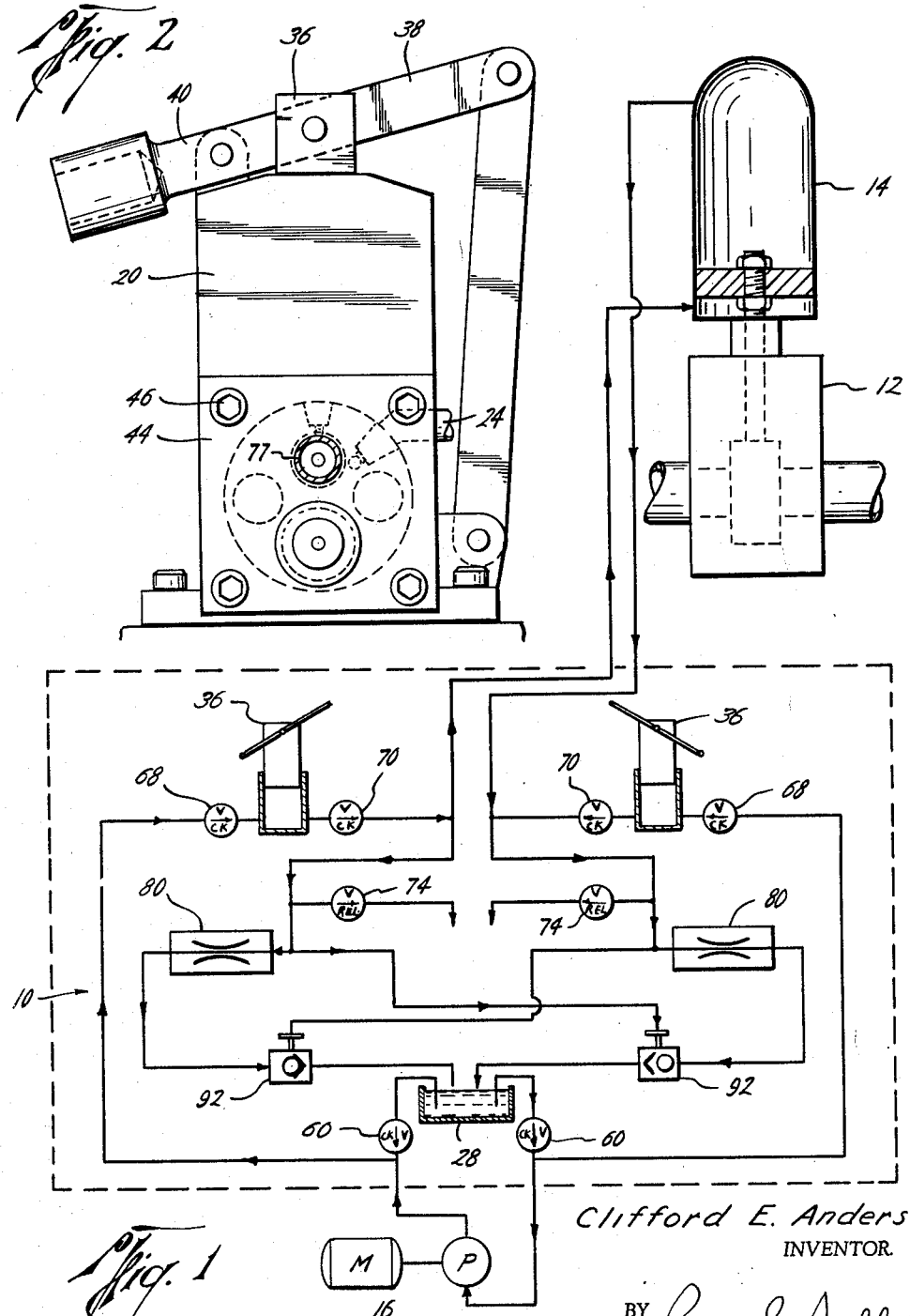

3,157,030
CONTROL UNIT
Clifford E. Anderson, Houston, Tex., assignor to ACF Industries, Incorporated, New York, N.Y., a corporation of New Jersey
Filed Oct. 8, 1962, Ser. No. 229,133
7 Claims. (Cl. 60—52)

The present invention relates to a unitary control unit for a valve having a double acting piston operator.

One means of automating a valve is to equip it with an operator having a double acting piston. Pressure on one side of the piston will move the valve in one direction and pressure on the other side of the piston will move the valve in the other direction. Many of these pressure systems are of the closed hydraulic type whereby a pressure source will direct fluid under pressure to one side or the other of the piston operator, and the fluid in the unpressurized side of the piston operator will return to a reservoir for later use. Since it is desirable to be able to operate the valve in the event of an emergency, it is customary to provide a hand pump which will permit manual operation upon power failure. The inclusion of the hand pump in the fluid system requires the use of various valves and a considerable amount of expensive individually tailored piping with the connections at the various units being a source of leakage.

The present invention contemplates a control unit for a double acting piston operator which is comprised of a unitary housing having all the required elements necessary for the operation of a double acting piston operator including emergency hand pump operation. The unit has two complete circuits, one for opening the valve and the other for closing the valve. These circuits can be energized by either external power or operated manually by hand pumps. The circuits are interconnected so that if one side is energized the other is activated to exhaust the unenergized side of the piston operator. The unit has two hand pumps, one to open the valve and the other to close the valve. In the event that there is an emergency, it is always desirable that the operation be simple, direct and not require setting various controls in order to effectuate operation; accordingly, the unit is so designed that all that is necessary for emergency operation is to operate the proper hand pump and the valve will be immediately operated without the switching of any controls. The unit has two inlet ports, each of which is adapted to selectively receive flow from an external power supply. The power supply may be remotely located and can be directed to either of the two inlets, one to open and one to close the valve. Connected to the line extending from the inlets are the two hand pumps for selectively applying pressure to one side or other of the piston operator in the event of power failure or if immediate operation is desired at the site. From each pump a passage extends to an outlet which is adapted for connection to one side of the piston operator. Check valves are located on each side of the hand pump so that hand pump pressure is directed through the outlet passage and not back to the inlet and so that outlet pressure does not flow back through the pump. The unit also has a common reservoir which stores fluid which is used by the hand pump to energize either side of the piston operator. A connection extends from the reservoir to each inlet port permitting flow from the reservoir through either circuit in the event of pump actuation. A check valve is in this connection which prevents flow from the inlet to the reservoir. There is a line from each outlet to the reservoir. This line is in communication with the passage from the pump to the outlet. A pressure relief valve is positioned in this line to relieve any excess pressure in the system back to the reservoir. Also in this line is an adjustable flow regulator valve which meters out the return flow from the unpressurized side of the piston operator so that there is smooth operation and no slamming of the operator. Also in the line are two pilot operated check valves. Actually, the pilot portion of one check valve is in each circuit and the valves are so connected that when one circuit is energized the pilot operates to open the check valve of the other circuit permitting return flow from the unenergized side of the piston operator.

It is an object of the present invention to provide a unitary control unit for a valve having a double acting piston operator which contains all the necessary elements to properly permit the functioning of the system including emergency operation in either direction.

It is another object to provide all of the controls for a double acting piston operator including emergency operation in one unitary device.

It is a further object to provide a unitary control unit for a double acting piston operator including two hand pumps for selectively operating the valve in either direction.

It is a further object to provide a universal control package for a double acting piston operated valve.

It is a further object to incorporate a unitary unit with the necessary controls for a double acting piston operated valve including emergency operation so that all that is necessary is to plug in the auxiliary or automatic power source.

It is a further object to provide a direction oriented emergency power operation for a double acting piston operator.

It is a further object to provide a unitary control unit having two complete fluid circuits, one for opening the valve and one for closing the valve which are interconnected so that the energization of one circuit by either external power or power from hand pump will cause the other circuit to be activated to permit metered exhaust of the unpressurized side of the piston.

It is a further object to provide a unitary control unit for a double acting piston operator which does not require a four way valve which has to be operated before the correct side of the operator can be energized.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purpose of illustration and description and are shown in the accompanying drawings, forming a part of the specification, wherein:

FIG. 1 is a schematic flow diagram of the unitary control unit of the present invention including an external power source and a double acting piston operated valve.

FIG. 2 is a cross sectional view of the unitary control unit.

Figure 3:
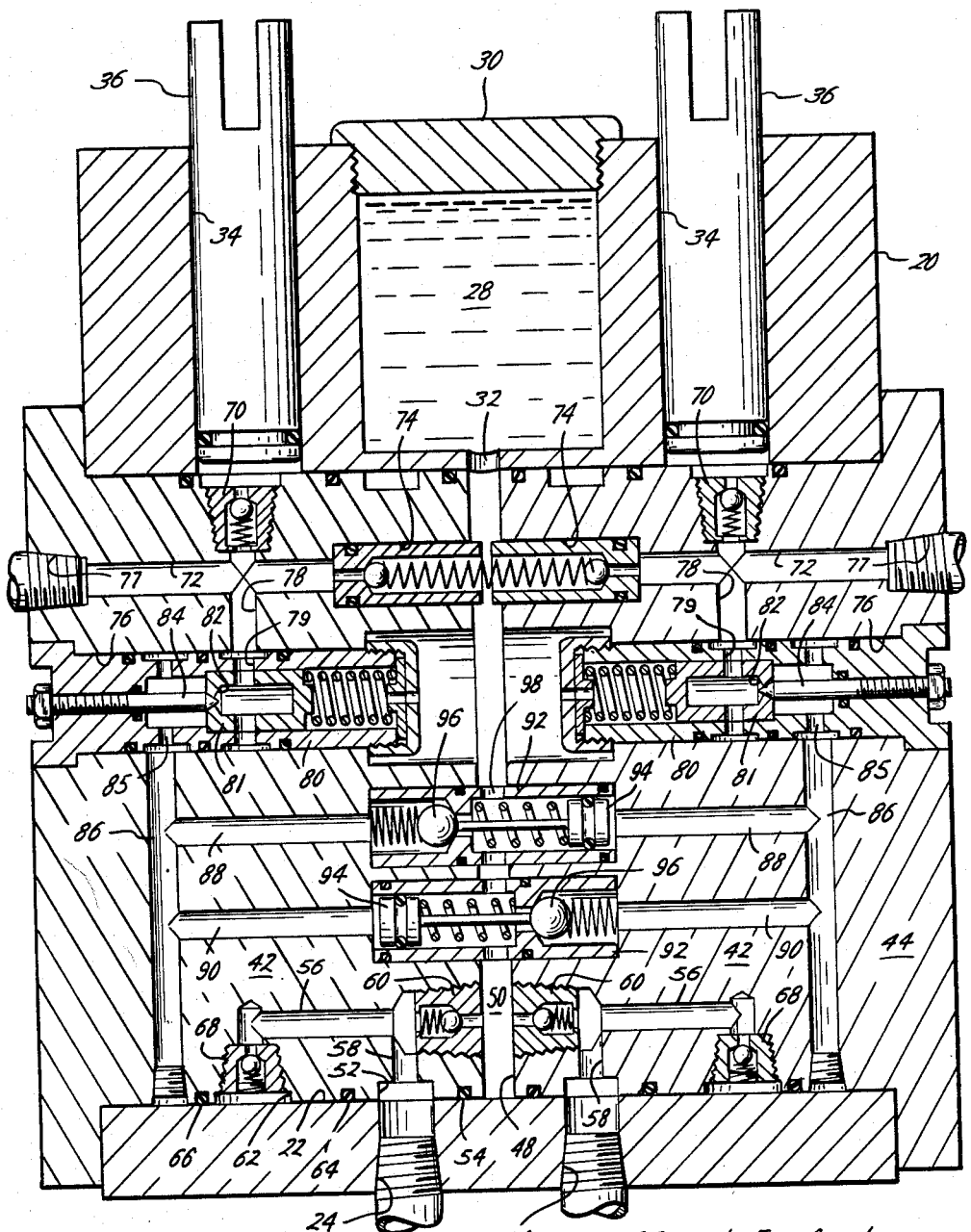
FIG. 3 is an elevational view of the control unit shown in FIG. 2.

Referring now to the drawings and particularly to FIG. 1, there is shown schematically the unitary control unit 10 of the present invention and its utilization as a control unit for operating a valve 12 having a double acting piston operator 14. Also shown is an external power source 16 which provides the necessary fluid pressure for normal power operation of the valve. Although the valve 12 is a reciprocating gate valve and the piston operator 14 is a reciprocating operator, the control unit 10 can be used for controlling any double acting operator be it the reciprocating piston type operator shown, a rotating piston operator, or even a twin cylinder operator. The control unit can be used to control an operating device which has pressure applied selectively to two sides for operation with the fluid from the unpressurized side being returned to the power source. Also, the valve may be any of the reciprocating types or rotating types. Also, the power source instead of being one such as is shown can be any type of power source which can selectively apply pressure to one side or other of the control unit. The various valve elements in the schematic diagram are provided with the same reference numerals used for the control unit, FIG. 2.

The unitary control unit 10, FIG. 3, is comprised of a housing 20 having a lonigtudinal cylindrical bore 22 therethrough. The geometrical terms used in describing the orientation of the several passages assume that the device is positioned as shown in the drawings and are for the purpose of description only and are not to be considered in a limiting sense. Located in the housing are two inlet ports 24 for selectively receiving flow from the external power supply 16. Each inlet 24 communicates with the cylindrical bore 22 and is positioned equidistant from the vertical axial centerline of the housing 20. The housing also has a cylindrical chamber 28 which forms a reservoir. A detachable closure 30 forms a cover for the reservoir 28. The chamber 28 is provided with a reservoir passage 32 which communicates with the cylindrical bore 22. The reservoir passage 32 is located approximately on the vertical axial centerline of the housing 20. In addition, the housing 20 is provided with two cylindrical chambers 34 which form cylinders for hand pumps. Each chamber 34 communicates with the cylindrical bore 22 and is positioned equidistant from the vertical axial centerline of the housing, however, more distant from the vertical axial centerline than the inlets 24. A hand pump piston 36 is located in each of the chambers 34. A handle 38 is provided for each of the hand pump pistons 36 making them operative hand pumps for use in emergency operations, as will be explained subsequently. If desired, locking devices 40 can be provided for the handles which will prevent movement of the pump handles 38 until unlocked by the operator to prohibit unlicensed operation.

The valve section of the control unit 10 is comprised of two cylindrical valve sections 42 which are identical in construction. One section 42 is positioned in each end of the cylindrical bore 22 and is detachably secured to the housing 20. As is shown, the cylindrical sections may be provided with a flange 44 through which threaded members 46 detachably secure the sections 42 to the housing 20. The inner ends 48 of the sections 42 terminate short of the axial centerline of the housing whereby there is a space 50 formed between the sections 42 which space 50 is in communication with the reservoir passage 32 from the reservoir 30. Each cylindrical section 42 has an inlet annular peripheral groove 52. The inlet grooves 52 are so positioned that they mate with the inlet ports 24 of the housing. Located between each inlet groove 52 and the inner end 48 of the respective section 42 is a peripheral seal 54 which forms seals between the inlet grooves 52 and space 50. The sections 42 are provided with a first longitudinal passage 56 which extends from the inner end 48 of the cylindrical section 42. A passage 58 connects the inlet annular peripheral groove 52 to the first longitudinal passage 56. In the inner end of the first longitudinal passage 56 there is a first check valve 60 which prohibits fluid from the inlet port 24 flowing into the space 50 between the two sections and permits flow from the space 50 into the first longitudinal passage 56. Each section is also provided with a hand pump annular peripheral groove 62 which is aligned with the hand pump cylinders 34. Positioned between the outer end of the section 42 and the hand pump groove 62 is an annular peripheral seal 66. Also, there is a peripheral seal 64 between the hand pump peripheral groove 62 and the inlet peripheral groove 52. The seals 64-66 seal the peripheral surface of the section 42 and prevent communication between the various grooves 52 and 62 as well as leakage outward of groove 62. A second check valve 68 is located in the hand pump annular peripheral groove 62 and is in communication with the first longitudinal passage 56. The check valve 68 permits flow from the inlet peripheral groove 52 through the first longitudinal passage 56 to pass therethrough but prohibits return flow. A third check valve 70 is located in the hand pump peripheral groove 62 in communication with the hand pump cylinder 34. The check valve 70 permits flow from the hand pump and from the hand pump peripheral groove 62, but prohibits flow back. The third check valve 70 is in communication with a second longitudinal passage 72, the axial outer end of which forms an outlet 77 of the control unit which is arranged for connection to one side of the piston operator. Accordingly, flow comes in inlet port 24, around the inlet groove 52, through the passage 58, into the longitudinal passage 56, through the check valve 68, around the hand pump groove 62, through the check valve 70, into the second longitudinal passage 72, through the outlet 77, to the side of the piston to which it is directed.

In order to prevent any overloading of the piston operator 14, the axial inner end of the second longitudinal passage 72 is provided with a preset pressure relief valve 74 which is in communication with the space 50; accordingly, if the pressure in outlet passage 72 exceeds the preset pressure of relief valve 74, any excess pressure will be discharged into space 50. The sections 42 are provided with a third longitudinal passage 76 which is connected to the second longitudinal passage by a passage 78. An adjustable flow regulator valve 80 is positioned in the third longitudinal passage 76 and is in communication with the passage 78 which extends from the second longitudinal passage 72. The flow regulator valve 80 has an inlet 79 leading into a spring biased pressure compensated cylinder 81 containing a seat 82. The valve 80 has an adjustable needle 84 extending from the other end, whereby flow through the valve is regulated and is constant at the oulet 85. A passage 86 extends from the third longitudinal passage 76 in communication with the outlet 85 of the flow regulator valve 80 and has two additional longitudinal passages 88-90 extending therefrom. Located in the passages 88-90 are identical pilot check valves 92 having a pressure cylinder pilot portion 94 which in response to pressure will upset a ball check valve 96. The check valve 92 has an outlet 98 communiacting with the space 50. One of the check valves 92 has the pilot portion 94 in one section 42 and the other has the check valve portion 96 in the section 42. The one having the pilot portion 94 subject the pressure will open the check valve portion 96 of the opposite circuit permitting exhausting of the flow through the circuit of the unenergized side of the piston operator 14 into the space 50 and back through the check valve 60 thence through the unpressurized line to the pressure source 16. During return flow from such side, the flow regulator valve 80 is so designed that the return flow from the unenergized side of the piston operator 14 will be metered out; therefore, the operation of the valve will be smooth and slamming of the operator will be prevented.

As previously explained, pressure exerted at the inlet port 24 will flow directly through the control unit circuit and the various elements to the side of the piston operator 14 to which it is connected. Additionally, some of the pressure will be diverted through the circuit and will exert pressure on the pilot portion 94 of the pilot check valve 92 of the energized circuit which will unseat the check valve portion 96 of the check valve 92 of the unenergized circuit thereby permitting a regulated return flow from the unpressurized side of the piston operator 14 through the flow regulator valve 80 of the unenergized circuit back to the reservoir of the power source.

The control unit in addition to directing flow from a power source through to the piston operator and permitting flow back therethrough has provisions for the emergency operation of the valve 12. In order to accomplish emergency operation, the hand pump which controls the side which is to be pressurized is operated. The hand pump will draw fluid from the reservoir 28 through the first check valve 60 and then through the inlet circuit as previously described and through the outlet port 77 to the proper side of the piston operator 14. At the same time, the fluid which is in the other side of the piston may again flow back through the unit to the reservoir as previously explained. This can be accomplished without any switching of valves by simply operating the hand pump. The locking devices 40, if provided to prevent unauthorized operation of the hand pump, must be unlocked prior to operation of the pump.

As can be seen from the schematic, FIG. 1, the two circuits are so arranged that external power can be supplied to either inlet and pressure will flow through the circuit that is energized and there will be regulated return through the other circuit. Due to the location of the check valves, either hand pump may be energized to provide emergency operation without switching any valve whatever. The hand pump will draw fluid from the reservoir and the fluid will flow through such circuit in the same manner as pressure supplied from an outside source. The check valve 60 prevents flow from inlet 24 entering into the reservoir and the check valves 74 and 68 on the two sides of the hand pump prevent flow from the outlet flowing back through the pump and inlet circuit. Instead, flow is directed through the flow regulator valve which meters out the return fluid. The unit having all enclosed valves can be economically manufactured using cartridge valves. The unit can be provided with the valve eliminating expensive individually tailored piping and the valve will be ready for operation upon installation of power lines.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

What I claim is:

1. An integral control unit for a valve having a double acting piston operator, said control unit comprising: a housing having a longitudinal cylindrical bore therethrough, two inlet ports for selectively receiving flow from an external power supply, each inlet port positioned equidistant from the axial centerline of the housing and communicating with the cylindrical bore, a cylindrical chamber forming a reservoir, a detachable closure (32) for the reservoir, a passage (32) from the reservoir communicating with the cylindrical bore located on the axial centerline of the housing, two cylindrical chambers forming cylinders for a hand pump, each chamber communicating with the cylindrical bore and positioned equidistant from the axial centerline of the housing and more distant from said axial centerline than the inlet ports, a hand pump piston in each chamber; two cylindrical valve sections, one positioned in each end of said cylindrical bore and secured to the housing, the inner end of the sections terminating short of the axial centerline whereby there is a space between said sections which is in communication with the passage from the reservoir, each cylindrical section having an inlet annular peripheral groove mating with the inlet port of the housing, a first longitudinal passage extending from the inner end of the cylindrical section, a passage from the inlet annular peripheral groove to the first longitudinal passage, a first check valve in the first longitudinal groove, prohibiting passage of flow from the inlet port flowing into the space between the sections and permitting flow from the space into the first longitudinal groove, a hand pump annular peripheral groove in communication with the hand pump cylinder, a second check valve in said hand pump peripheral groove in communication with the first longitudinal passage permitting flow from an inlet port to pass therethrough but prohibiting return flow, a third check valve in the hand pump peripheral groove in communication with the hand pump cylinder, a second longitudinal passage in communication with the third check valve, the axial outer end of said second longitudinal passage being one of the outlets of the control unit and arranged for connection to one side of the piston operator, the axial inner end of said second longitudinal passage being provided with a pressure relief valve which will dump excess pressure into the space between the cylindrical sections, a third longitudinal passage, a passage connecting the second and third longitudinal passages, an adjustable flow regulator valve in said third longitudinal passage communicating with the passage from the second longitudinal passage and metering flow therethrough, fourth and fifth longitudinal passages, a passage from the third longitudinal passage communicating with said fourth and fifth longitudinal passages, the passage from the third longitudinal passage receiving flow from the flow regulator valve, pilot check valves having a pilot portion and a check valve portion controlled by the pilot portion in said fourth and fifth longitudinal passages, the pilot check valves extending into the respective passage in the other section and communicating with the space between the sections, the pilot check valves being oppositely positioned so that one will have the pilot portion receiving flow and the other will have the check portion receiving flow whereby when pressure is connected to inlet of one section such pressure will contact the pilot of one pilot check valve and open the valve in the other section permitting return flow from such section, and annular peripheral seals sealing the peripheral grooves from each other and from the inner and outer ends of the cylindrical sections.

2. An integral control unit for a valve having a double acting piston operator, said control unit comprising: a housing having a longitudinal cylindrical bore therethrough, two inlet ports for selectively receiving flow from an external power supply, each of the inlet ports being positioned equidistant from the axial centerline of the housing and communicating with the cylindrical bore, a cylindrical chamber forming a reservoir, a detachable closure for the reservoir, a passage from the reservoir communicating with the cylindrical bore located on the axial centerline of the housing, two cylindrical chambers forming cylinders for a hand pump, each chamber communicating with the cylindrical bore and positioned equidistant from the axial centerline of the housing and more distant from said axial centerline than the inlet ports, a hand pump piston in each chamber, two cylindrical valve sections having an inner end and an outer end, one positioned in each end of said cylindrical bore and detachably secured to the housing, the inner end of the sections terminating short of the axial centerline whereby there is a space between which is in communication with the passage from the reservoir, each cylindrical section having an inlet annular peripheral groove aligned with the inlet port of the housing, a first longitudinal passage extending from the inner end of the cylindrical section, a passage from the inlet annular peripheral groove to the first longitudinal passage, a first check valve in the first longitudinal groove, prohibiting passage of flow from the inlet port flowing into the space between the sections and permitting flow from the space into the longitudinal groove, a hand pump annular peripheral groove in communication with the hand pump cylinder, a second check valve in said hand pump peripheral groove in communication with the first longitudinal passage, permitting flow from an inlet port to pass therethrough but prohibiting return flow, a third check valve in the second peripheral groove in communication with the hand pump cylinder, a second longitudinal passage in communication with the third check valve, the axial outer end of said second longitudinal passage being an outlet of the control unit and arranged for connection to one side of the piston operator, the axial inner end of said second longitudinal passage being provided with a pressure relief valve which will pump excess pressure into the space between the cylindrical sections, a third longitudinal passage, a passage connecting the second and third longitudinal passages, an adjustable flow regulator valve in said third longitudinal passage communicating with the passage from the second longitudinal passage, fourth and fifth longitudinal passages, a passage from the third longitudinal passage communicating with said fourth and fifth longitudinal passages, pilot check valves in said fourth and fifth longitudinal passages, the pilot check valves extending into the respective passage in the other section and communicating with the space between the sections, the pilot check valves being oppositely positioned so that one will have the pilot receiving flow and the other will have the check portion receiving flow whereby when one section is energized the other section will be activated to permit return of fluid.

3. For a valve having a double acting piston operator, a unitary control unit comprising: two inlet ports each adapted to selectively receive fluid pressure from an external power supply, two hand pumps for selectively supplying emergency fluid pressure to one side or the other of the double acting piston operator, an inlet passage from each inlet port to one of the hand pumps, a check valve in each inlet passage permitting flow from the inlet port to a selected pump but prohibiting flow from said pump to the inlet port, an outlet passage from each pump to one side of the double acting piston operator, a check valve in each outlet passage permitting flow from the pump to the piston operator but prohibiting flow from the piston operator to the pump, a common reservoir, a connection from the reservoir to each inlet port, a check valve in each connection preventing flow from either inlet port to the reservoir but permitting flow from the reservoir to either inlet port for flow to the pump upon activation of the pump, a line from each side of the piston operator to the reservoir, each line in communication with its respective outlet passage from one of the pumps to the piston operator, a relief valve in each of said lines relieving any excess pressure in the unit into the reservoir, an adjustable flow regulator valve in each of said lines, a pilot operated check valve in each of said lines, the pilot operated check valves being so connected that when there is flow through one inlet passage the flow will open the pilot operated check valve of the other side permitting metered return of fluid through the adjustable flow regulator valve from the unpressurized side.

4. For a device having a double acting piston operator, a unitary control unit having two circuits each having an inlet port adapted to selectively receive fluid pressure from an external power supply, two hand pumps for selectively supplying emergency fluid pressure to one side or the other of the double acting piston operator, an inlet passage from each inlet port to one of the hand pumps, a check valve in each inlet passage permitting flow from the inlet port to a selected pump but prohibiting flow from said pump to the inlet port, an outlet passage from each pump adapted for connection to one side of the double acting piston operator, a check valve in each outlet passage permitting flow from the pump to the piston operator but prohibiting flow from the piston operator to the pump, a reservoir common to the two circuits, a connection from the reservoir to each inlet port, a check valve in said connection preventing flow from the inlet port to the reservoir but permitting flow from the reservoir to the inlet port for flow to the pump upon activation of the pump, a line from each outlet passage to the reservoir, a relief valve in each of said lines relieving any excess pressure in the unit into the reservoir, in adjustable flow regulator valve in each of said lines, the pilot operated check valves being so connected that when there is flow through one circuit the flow will open the pilot operated check valve of the other circuit permitting exhaust of fluid from the unenergized side of the piston operator.

5. For a device having a double acting piston operator, a unitary control unit comprising two circuits each having an inlet port adapted to selectively receive fluid pressure from an external power supply, two hand pumps for selectively supplying fluid pressure to one side or the other of the double acting piston operator, a passage from each inlet port to one of the hand pumps, a check valve in each passage permitting flow from the inlet port to a selected pump but prohibiting flow from the pump to said inlet port, a passage from each pump to an outlet port adapted for connection to one side of the double acting piston operator, a check valve in each passage permitting flow from the pump to the piston but prohibiting flow from the piston to the pump, a common reservoir, a connection from the reservoir to the inlet port, a check valve in said connection preventing flow from the inlet port to the reservoir but permitting flow from the reservoir to the inlet port for flow to a selected pump upon activation of the pump, a line from each outlet port to the reservoir, each line in communication with the passage from the pump to the outlet port, a relief valve in each of said lines relieving any excess pressure in the unit into the reservoir, a pilot operated check valve in each of said lines, the pilot operated check valves being so connected that when there is flow through one inlet passage the flow will open the pilot operated check valve of the other side permitting exhaust of fluid from the unpressurized side of the piston operator.

6. For a device having a double acting piston operator which is energized on one side or the other selectively to operate the device, a unitary control unit having two fluid circuits for selectively communicating externally supplied fluid pressure to one side or the other side of the piston operator, each of said two fluid circuits having a hand pump which can be utilized to supply emergency fluid pressure to one side or the other of the piston operator, a reservoir common to each of said fluid circuits for supplying fluid to the hand pumps, a pilot operated check valve positioned in each of said two fluid circuits, each of said check valves having a pilot portion thereof in communication with the other of two fluid circuits whereby pressurization of either of said two fluid circuits by either the externally supplied fluid pressure or hand pump pressure causes actuation of the ball check valve of the other circuit to permit exhaust of the unpressurized side of the piston operator.

7. For a device having a double acting piston operator which is energized on one side or the other selectively to operate the device, a unitary control unit comprising: a first fluid circuit and a second fluid circuit for selectively communicating externally supplied fluid pressure to one side or the other side of the piston operator, each of said first and second fluid circuits having a hand pump normally being out of communication with the respective fluid circuit which can be utilized to supply emergency fluid under pressure to one side or the other of the piston operator, a reservoir within said unit normally being out of fluid communication with the externally pressurized circuit, said reservoir supplying fluid to either of the hand pumps through a selected one of said fluid circuits upon actuation thereof, a first pilot controlled check valve in said first fluid circuit having a pilot portion thereof in communication with said second fluid circuit, a second pilot check valve in said second fluid circuit having a pilot portion thereof in communication with said first fluid circuit, ether of the first or second fluid circuits, upon being energized by either externally supplied fluid pressure or hand pump supplied fluid pressure, actuating the pilot check valve of the other fluid circuit to vent the fluid therein.

References Cited in the file of this patent

UNITED STATES PATENTS

| | | |
|---|---|---|
| 1,616,841 | Beebe | Feb. 8, 1927 |
| 3,069,855 | Denkowski et al. | Dec. 25, 1962 |

UNITED STATES PATENT OFFICE
CERTIFICATE OF CORRECTION

Patent No. 3,157,030                      November 17, 1964

Clifford E. Anderson

It is hereby certified that error appears in the above numbered patent requiring correction and that the said Letters Patent should read as corrected below.

Column 4, line 66, for "communiacting" read -- communicating --; column 5, lines 71 and 72, strike out "(32)", each occurrence; column 8, line 20, for "in", first occurrence, read -- an --; line 21, after "lines," insert -- a pilot operated check valve in each of said lines, --; column 10, line 3, for "ether" read -- either --.

Signed and sealed this 20th day of April 1965.

(SEAL)
Attest:

ERNEST W. SWIDER                                 EDWARD J. BRENNER
Attesting Officer                                     Commissioner of Patents